United States Patent [19]
Babitzka et al.

[11] Patent Number: 4,512,452
[45] Date of Patent: Apr. 23, 1985

[54] SLIP CLUTCH

[75] Inventors: Rudolf Babitzka, Kirchberg; Gottlob Haag, Jettingen; Ernst Linder, Mühlacker, all of Fed. Rep. of Germany

[73] Assignee: Robert Bosch GmbH, Stuttgart, Fed. Rep. of Germany

[21] Appl. No.: 283,663

[22] Filed: Jul. 15, 1981

[30] Foreign Application Priority Data

Aug. 5, 1980 [DE] Fed. Rep. of Germany ....... 3029627

[51] Int. Cl.³ ..................... F16D 43/18; F16D 13/72
[52] U.S. Cl. ............................ 192/104 C; 192/112; 192/113 A
[58] Field of Search ............ 192/85 F, 104 C, 104 F, 192/58 B, 113 A, 113 B, 112, 79; 310/113; 403/366, 277, 153, 5

[56]  References Cited
U.S. PATENT DOCUMENTS

| | | | |
|---|---|---|---|
| 2,406,940 | 9/1946 | Brill | 403/153 |
| 2,506,520 | 5/1950 | Spase | 192/104 C X |
| 2,746,587 | 5/1956 | Spase | 192/104 C |
| 2,758,689 | 8/1956 | Spase | 192/104 C |
| 3,897,860 | 8/1975 | Brock et al. | 192/113 B |
| 3,921,772 | 11/1975 | Hayashi et al. | 192/113 A |
| 4,046,239 | 9/1977 | Tinholt | 192/58 B |
| 4,181,205 | 1/1980 | Mennucci et al. | 192/113 A |
| 4,265,421 | 5/1981 | Buchmayer | 403/366 X |

Primary Examiner—Rodney H. Bonck
Attorney, Agent, or Firm—Michael J. Striker

[57]  ABSTRACT

A slip clutch for transmitting torque between a drive motor having an output member and a generator having an input member has a transmitting element including a spring element with a friction element, and a ventilator is connected with one of the members for joint rotation therewith. The ventilator may be mounted on one of two housing parts which together form an oil-containing chamber.

12 Claims, 4 Drawing Figures

SLIP CLUTCH

BACKGROUND OF THE INVENTION

The present invention relates to a slip clutch. More particularly, it relates to a slip clutch for transmitting torque between a drive motor and a generator.

Slip clutches of the above-mentioned general type are known in the art. A known slip clutch has a clutch housing in which a spring element is arranged so that when a predetermined limiting number of revolutions is attained the transmission of torque between the drive motor and generator is maintained constant. This is attained by the fact that when this number of revolutions is reached, the spring element with its friction element is lifted from a part with which it has been coupled. The spring element is arranged in a fluid-tight chamber and located in an oil bath. The above-described known clutch has, however, the disadvantage that, in the event of unfavorable operational conditions, it is considerably heated up.

SUMMARY OF THE INVENTION

Accordingly, it is an object of the present invention to provide a slip clutch which avoids the disadvantages of the prior art.

More particularly, it is an object of the present invention to provide a slip clutch which has a ventilating arrangement which makes possible an improved heat removal and thereby a higher transmission of power.

In keeping with these objects, and with others which will become apparent hereinafter, one feature of the present invention resides, briefly stated, in a slip clutch for transmitting torque between a drive motor having an output member and a generator having an input member, wherein a ventilator is connected with one of these members for joint rotation therewith, preferably at the outer side of this member.

When the slip clutch is designed in accordance with the present invention, it is characterized by an improved heat removal, and thereby a higher power transmission.

In accordance with another feature of the present invention, the ventilator is arranged on one of two housing parts which together form a housing accommodating an oil bath for a spring element. More particularly, the ventilator has a ring part and a plurality of vanes and arranged so that the ring part of the ventilator is received in a groove provided in one of the housing parts. The housing has a ventilating opening which communicates the inner chamber of the housing with the exterior of the latter.

In accordance with still another feature of the present invention, one of the housing parts is cup-shaped, whereas the other housing part is cover-shaped and arranged to close the cup-shaped housing part. Both housing parts may be formed as sheet-metal parts.

In accordance with a further advantageous feature of the present invention, the ventilator may be formed of one piece with one of the housing parts.

The novel features which are considered characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 1:
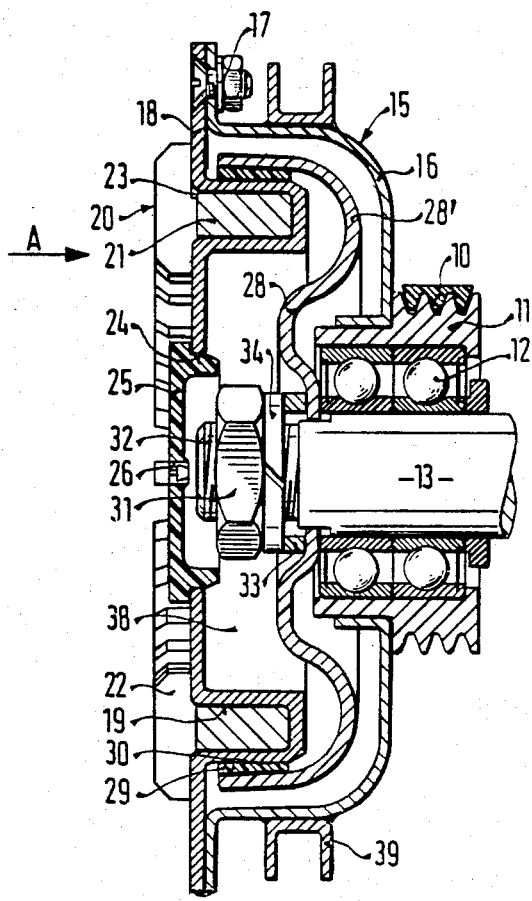
FIG. 1 is a view showing a slip clutch in accordance with the present invention.

A slip clutch in accordance with the present invention is utilized for transmitting torque between a drive motor and a generator. A multi-groove belt 10 transmits the torque from the drive motor to a belt pulley 11. The belt pulley 11 is supported via a one-piece double-inclined ball bearing 12 on a drive shaft 13 of the generator.

A clutch housing 15 is non-rotatably mounted on the belt pulley 11. The housing 15 has a substantially cup-shaped housing part 16 and a cover-shaped housing part 18 which is mounted on the housing part 16 with the aid of screws 17. The housing parts 16 and 18 are formed advantageously as deep-drawn steel sheets, whereas the housing 15 is connected with the belt pulley 11 by brazing. The housing part 18 has a ring-shaped recess 19 provided adjacent to its outer region. The slip clutch has a ventilator which is identified by reference numeral 20 and has a ring-shaped bottom part 21 and a plurality of vanes 22 which extend axially outwardly from the bottom part 21. The bottom part 21 of the ventilator 20 is received in the recess 19 of the housing part 18. The ventilator 20 is advantageously composed of aluminum and mounted at a location 23 in the housing part 18 by calking.

The cover-shaped housing part 18 has a central opening 24 which is closed by a cover 25 composed advantageously of a synthetic plastic material. The cover 25 has a central ventilating opening 26.

A spring element 28 is arranged in the interior of the housing 15 and has a plurality of U-shaped arms 28' which extend radially outwardly. The arms 28' have inner sides provided with friction coatings or elements 29. The friction elements 29 are pressed under the action of the springy arms 28' against a friction face 30 provided on a housing wall which forms the recess 19. More particularly, the friction face 30 is formed on the outer periphery of this wall.

The shaft 13 has a threaded end portion 32, and the spring elements 28 is mounted on this portion with the aid of a nut 31. The spring element 28 is pressed via a pressure member 33 and a safety ring 34 against an inner ring of the bearing 12. The belt transmission is performed thereby from the belt pulley 11 via the housing 15 to the spring element 28, and from the latter to the shaft 13. The housing 15 forms an inner chamber 38 which is partially filled with oil. The oil bath does not reach the bearing 12. The ventilation of this chamber is performed via the ventilating opening 26.

A sheet ring 39 is soldered on the outer surface of the housing 15. The ring 39 has a U-shaped cross section and serves for cooling of the housing 15.

Figure 2:
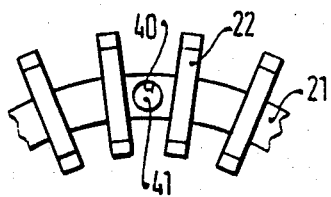
FIG. 2 is a view showing a portion of the slip clutch of FIG. 1, as seen in the direction of the arrow A.

As can be seen from FIG. 2, the bottom part 21 of the ventilator 20 is provided with a plurality of axial openings 40 in which a plurality of tensioning pins 41 are inserted. Thereby, the bottom part 21 is formed with a plurality of expansible regions so that the bottom part 21 of the ventilator is uniformly pressed against the wall of the annular recess 19.

The belt pulley 11 is driven by the motor with accelerating speed of transmission. The oil accommodated in the chamber 38 flings outwardly under the action of centrifugal force and sprays the outer edge of the spring element 28 and the friction element 29. When the rotational speed reaches its upper limit of, for example, 15,000 revolutions per minute, the arms 28' of the spring element 28 are so outwardly bent under the action of the very strongly increased centrifugal forces that the required torque is transmitted by sliding friction between the spring elements 28 and the friction element 29. The increasing rotational speed increases the hydrodynamic friction, so that only a small increase of the rotational speed takes place or, in other words, the number of revolutions of the drive shaft remains approximately constant.

Figure 3:
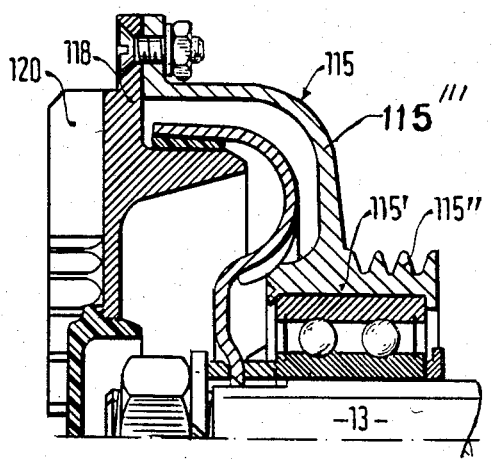
FIGS. 3 and 4 are views showing portions of the slip clutch in accordance with further embodiments of the present invention.

The slip clutch shown in FIG. 3 differs from that of FIG. 1, in the fact that a coupling housing 115 is formed as a one-piece member which includes a hub 115', a belt pulley 115", and a cup-shaped housing part 15'''. This one-piece housing 115 may be composed of aluminum cast. Another distinctive feature of this embodiment is that a ventilator 120 is directly formed on a housing part 118, or in other words it is of one piece with the latter. The thus formed integral member may be composed of aluminum with a plasma sprayed wear-resistant coating.

Figure 4:
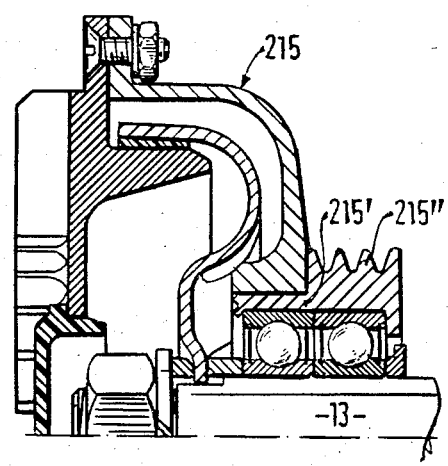

The slip clutch shown in FIG. 4 differs from that of FIG. 3 in that a housing part 215 which is also composed of cast aluminum is formed not of one piece with a hug 215' and a belt pulley 215". On the other hand, the hub 215' and the belt pulley 215" are of one piece with one another and may be formed as a steel bush. This bush is cast in the housing part 215. The bush simultaneously forms a receiving element for receiving the bearing.

It will be understood that each of the elements described above, or two or more together, may also find a useful application in other types of constructions differing from the types described above.

While the invention has been illustrated and described as embodied in a slip clutch, it is not intended to be limited to the details shown, since various modifications and structural changes may be made without departing in any way from the spirit of the present invention.

Without further analysis, the foregoing will so fully reveal the gist of the present invention can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

We claim:

1. A slip clutch for transmitting torque between a drive motor having an output member and a generator having an input member, comprising a transmitting element rotatable about an axis and arranged to transmit torque from the output member of the drive motor to the input member of the generator with limitation of a rotational speed under the action of a centrifugal force acting upon said transmitting element, said transmitting element being connected with one of said members and including a spring element; a friction element provided on said spring element and arranged so that said spring element presses said friction element against the other of said members with a prestress; means forming a substantially closed fluid-tight chamber which is symmetrical relative to said axis of rotation and accommodates a fluid and said spring element and said friction element, said chamber being partially filled with oil; a ventilator, said members being first and second members, said first member having an annular groove and an outer exposed side, and said ventilator being arranged on said outer exposed side and connected with said first member for joint rotation therewith, said ventilator having a ring part and a plurality of vanes, said ring part being inserted into said annular groove and connected therein with said first member; and a housing which at least partially forms said transmitting element and has one housing part arranged to face toward said input member and another housing part arranged to face away from the latter, said housing parts together bounding said chamber, said annular groove for receiving said ring part of said ventilator being formed in said second housing part, said housing being provided with a ventilating opening which communicates said chamber with the exterior of said housing.

2. A slip clutch for transmitting torque between a drive motor having an output member and a generator having an input member, comprising a transmitting element rotatable about an axis and arranged to transmit torque from the output member of the drive motor to the input member of the generator with limitation of a rotational speed under the action of a centrifugal force acting upon said transmitting element, said transmitting element being connected with one of said members and including a spring element; a friction element provided on said spring element and arranged so that said spring element presses said friction element against the other of said members with a prestress; means forming a substantially closed fluid-tight chamber which is symmetrical relative to said axis of rotation and accommodates a fluid and said spring element and said friction element, said chamber being partially filled with oil; a ventilator, said members being first and second members, said first member having an outer exposed side, and said ventilator being arranged on said outer exposed side and connected with said first member for joint rotation therewith; and a housing which at least partially forms said transmitting element and has one housing part arranged to face toward said input member and another housing part arranged to face away from the latter, said housing parts together bounding said chamber, said housing being provided with a ventilating opening which communicates said chamber with the exterior of said housing.

3. A slip clutch as defined in claim 2, wherein said first member has an annular groove, said ventilator having a ring part and a plurality of vanes, said ring part of said ventilator being inserted into said annular groove of said first member and connected therein with said first member.

4. A slip clutch as defined in claim 3, wherein said ring part of said ventilator is connected in said groove with said first member by calking.

5. A slip clutch as defined in claim 3, wherein said ring part of said ventilator has a plurality of expansible regions formed as openings, and a plurality of spring pins inserted into said openings.

6. A slip clutch as defined in claim 2, wherein said annular groove for receiving said ring part of said ventilator is formed in said second housing part.

7. A slip clutch as defined in claim 2, wherein said housing has an outer surface and is provided with cooling means arranged on said outer surface.

8. A slip clutch as defined in claim 7, wherein said cooling means is formed as a ring element having a U-shaped cross section and mounted on said outer surface of said housing.

9. A slip clutch as defined in claim 2, wherein said one housing part is substantially cup-shaped, whereas said other housing part is cover-shaped and arranged to close said cup-shaped one housing part.

10. A slip clutch as defined in claim 2, wherein said housing parts are composed of aluminum.

11. A slip clutch as defined in claim 10; and further comprising a coating applied on said housing parts, said coating is a plasma spraying-produced coating.

12. A slip clutch as defined in claim 10, wherein said ventilator is formed of one piece with one of said housing parts.

* * * * *